June 4, 1929.  H. KOBAYASHI  1,715,765
AIR BRAKE APPARATUS
Filed July 15, 1927   3 Sheets-Sheet 1
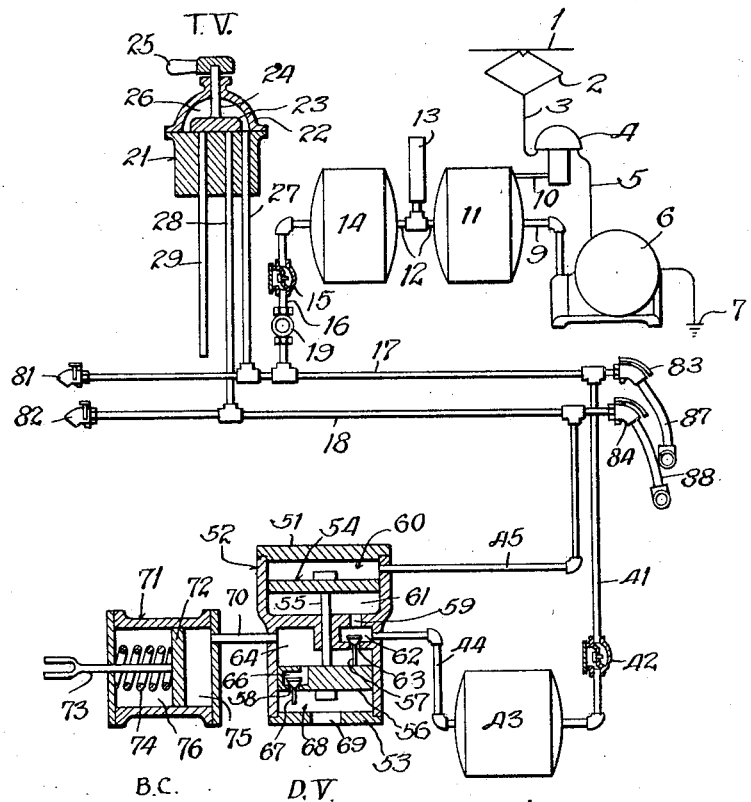
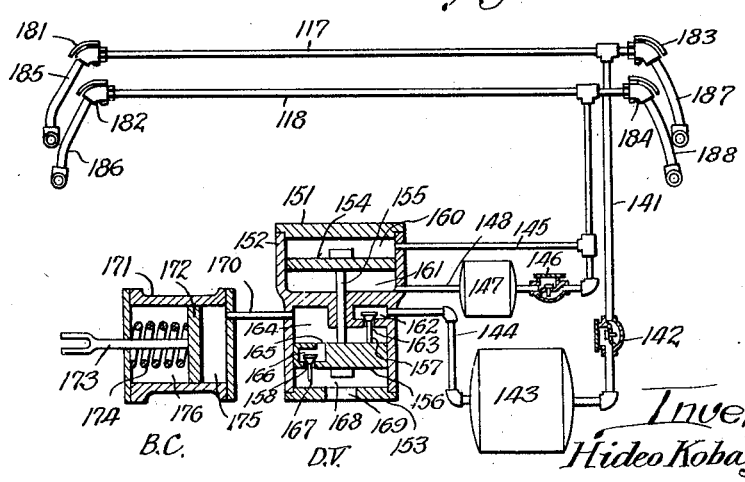
Inventor
Hideo Kobayashi
By Siggers & Adams
Attorneys June 4, 1929.  H. KOBAYASHI  1,715,765
AIR BRAKE APPARATUS
Filed July 15, 1927   3 Sheets-Sheet 2
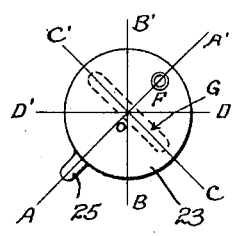
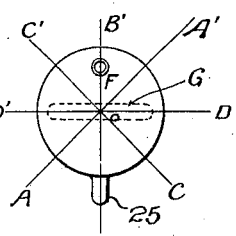
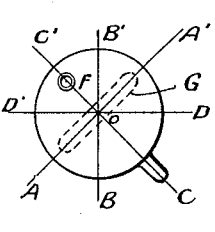
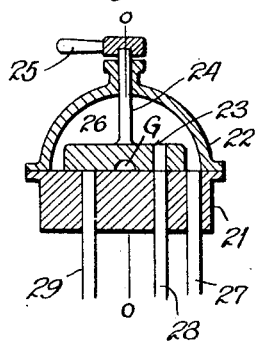
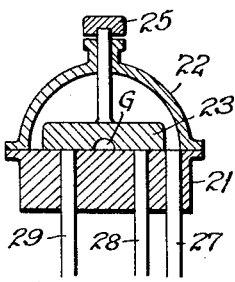
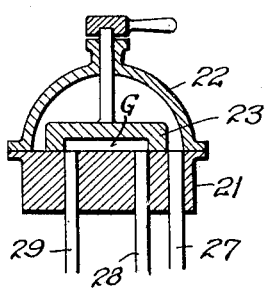
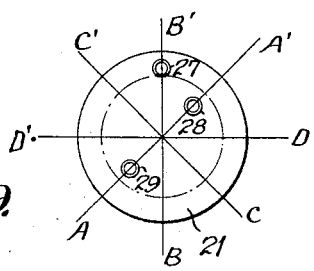
Inventor.
Hideo Kobayashi
By
Attorneys

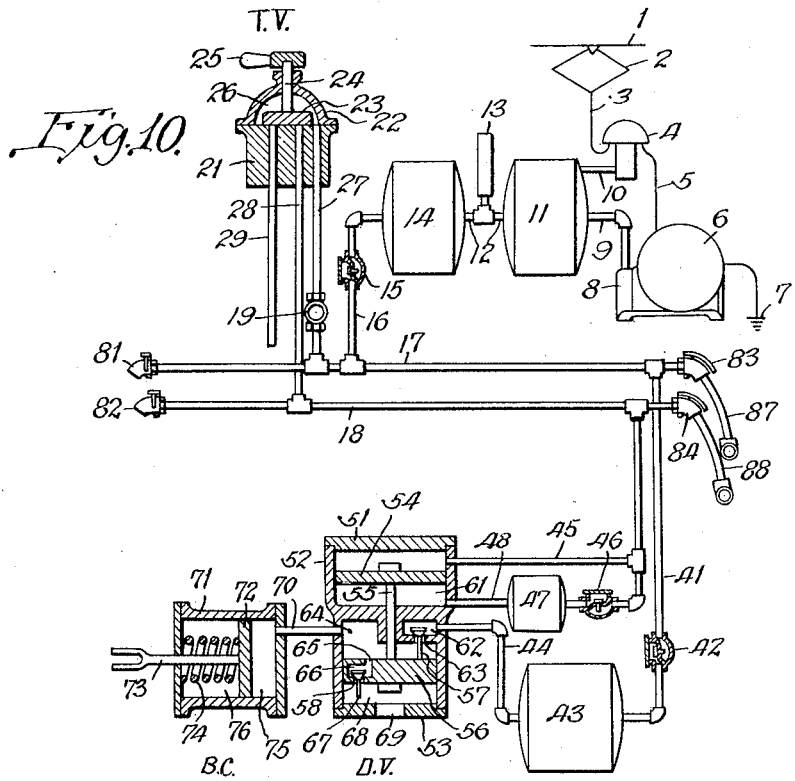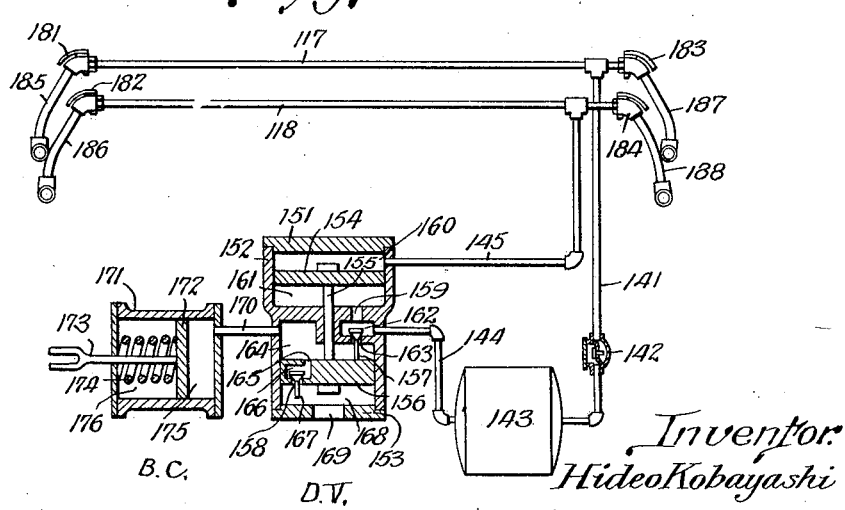

Patented June 4, 1929.

1,715,765

UNITED STATES PATENT OFFICE.

HIDEO KOBAYASHI, OF TOKYO, JAPAN.

AIR-BRAKE APPARATUS.

Application filed July 15, 1927, Serial No. 207,056, and in Japan September 27, 1926.

My invention relates to improvements in air brake apparatus, and aims among other objects, to provide an improved apparatus of this character especially adapted for successively repeated brake action. Another object of the invention is to dispense with triple and distributing valves by providing a differential valve device, which is simple and durable in construction and precise in operation.

The present invention has reference to my co-pending application, No. 206,055.

The invention is more particularly illustrated with reference to the accompanying drawings, in which Fig. 1 is a diagrammatic view of one embodiment of the air brake apparatus for use with electric motor cars;

Fig. 2 is a similar view of the air brake apparatus for trailer cars;

Figs. 3 to 8 are diagrammatic views showing the various positions of the train brake valve;

Fig. 9 is a plan view of the train brake valve seat showing the position of the parts therein;

Figs. 10 and 11 show a modified form of the invention.

Referring to Figs. 1 and 2 which diagrammatically show an embodiment of the invention as applied to an electric train, 1 is the trolley wire, 4 is a governer for the air compressor, 6 is a motor driven air compressor, 11 and 14 are high pressure air reservoirs, 13 is a safety valve, T. V. is the train brake valve, 17 is a high pressure pipe which is successively connected by the hose 87, 185 and 187 to the high pressure pipe 117 of each trailer car so as to extend through the whole train. 18 is a brake pipe connected to the brake or train pipe 118 by hose 88, 186 and 188 of each trailer car, to extend through the train.

D. V. are differential valves, B. C. are brake cylinders, 43 and 143 are automatic or auxiliary air reservoirs having proper capacities in relation to their respective brake cylinders and connected through check valves 42 and 142 to the high pressure pipes 17 and 117.

Electric current of the trolley line 1 flows from the pantograph or any other suitable collecting means 2 and the auxiliary circuit 3 to the governer 4, then through the auxiliary circuit 5 to the motor 6 which operates the air compressor 8 and finally to the ground 7. Air pressure generated in the air compressor 8 passes through a delivery pipe 9 to the first high pressure reservoir 11, thence into the second high pressure reservoir 14 to be accumulated therein. The governor 4 acts to make or break the electric circuit of the motor 6 for driving the air compressor by means of a piston operated by the pressure of the air reservoir 11 through the pipe 10, so that a predetermined air pressure may be maintained, for instance, 6 to 8 kilograms per square centimetre. The safety valve 13 permits the escape of air in the reservoirs, to avoid danger of excessive pressure in case the governor 4 gets out of order or from any other causes. The check valve 15 acts to prevent any fluid from flowing back into the reservoir 14. The feed valve 19 supplies the air pressure in the reservoirs 11 and 14 to the high pressure pipes 17 and 117 reducing it to the normal pressure which is preferably 5 kilograms per square centimetre.

The train brake valve or operator valve, T. V., is preferably arranged in the operator's room. The body 21 of said valve is provided at its top with a flat valve seat and the upper ends of the constant pressure branch pipe 27, the variable pressure branch pipe 28 and the exhaust pipe 29 which communicates with the atmosphere, terminate at said valve seat. A rotary valve 23, within the cap 22, co-acts with the seat and by rotating said valve by a handle 25 fixed at the upper end of the valve spindle 24, the variable pressure branch pipe 28 may communicate either with the constant pressure branch pipe 27 or to the exhaust pipe 29 for increasing or reducing the pressure in the variable pressure pipe 18 for a purpose to be described.

Referring to Fig. 9, the broken line indicates that part of the valve seat covered by the rotary valve 23. The opening of the high pressure branch pipe 27 being situated outside the rotary valve 23, air pressure is always in the space inside the valve cap 22 and the rotary valve 23 is held against the valve seat, to prevent any escape of air.

In Figs. 3, 5 and 7, A, B and C respectively, indicate the positions of "release", "lap" and "brake".

Figs. 3 and 4 show the position of release. When the handle 25 is brought at A, the opening F of the rotary valve comes in alignment with the opening of the brake branch pipe 28 so that the latter is in communication with the high pressure branch pipe 27, and when maintained in this position for awhile, the pressure in the brake pipe 18 is increased equal to the pressure in the high pressure pipe 17.

Figs. 5 and 6 show the lap position. In this case, all the openings are shut off from one another, and the variable pressure pipe as well as the high pressure pipe retain their existing pressures, (the leakage of air being ignored).

Figs. 7 and 8 show the brake position. The brake branch pipe 28 is in communication with the exhaust pipe 29 through the port G of the rotary valve 23 and when maintained for awhile in this position, the brake pressure is reduced to atmospheric pressure.

As stated above, the operator may vary the pressure of the variable pressure pipe between the limits of the pressure in the high pressure pipe 17 and atmospheric pressure, slowly or quickly at will, by proper manipulation of the handle 25 of the train brake valve, T. V.

The differential valve, D. V., Figs. 1 and 2, is preferably cylindrical and is provided at one end with a cover 51 for the variable pressure chamber 60 and at the other end with a cover 53 for the exhaust chamber. The variable pressure chamber 60 is connected to aforesaid variable pressure pipe 18 by a branch pipe 45, and the pressure in the chamber is varied according to the change of pressure in the variable pressure pipe. The constant pressure chamber 61 forms a cylinder with the variable pressure chamber and is in communication with the automatic air chamber 62 by an air port 59. The automatic air chamber 62 is connected to the automatic air reservoir 42, and the pressure in the constant pressure chamber 61 is the same as the pressure in the automatic air reservoir 43.

The brake pressure chamber 64 forms another cylinder together with the exhaust chamber 68, said brake pressure chamber being connected at its side to the brake cylinder 71 by the brake air pipe 70. The pressure in the brake pressure chamber is always the same as the pressure of the brake cylinder or so-called brake pressure. The brake pressure chamber is in communication with the automatic air chamber 61 by means of a port 63 controlled by a brake air valve 57.

The valve actuator of the differential valve comprises two pistons 54 and 56 rigidly connected together by a piston rod 55. The first piston 54 partitions the variable pressure chamber 60 from the constant pressure chamber 61 so that it is subjected on one side to the pressure in the variable pressure chamber or that in the brake pipe, and on the other side to the pressure in the constant pressure chamber or that in the automatic air reservoir, and slides within said chambers. The second piston 56 partitions the brake pressure chamber 64 from the exhaust chamber 68 and is subjected on one side to the brake pressure and on the other side to the atmospheric pressure, and slides within the chambers 64 and 68.

The second piston 56 need not be constructed as shown. For instance, (in case some leakage of air is not concerned), the brake air opening and the exhaust opening may be formed at the side of the brake pressure chamber 64 and operate in a manner similar to a piston valve in a reciprocating engine. But the construction shown is preferably used in view of avoiding the leakage of air. The second piston 56 is provided with exhaust ports 58 and 65, one on each side, with a valve chamber 66 between them. Within the valve chamber, an exhaust valve 67 is arranged to normally close the port 58 and has a stem projecting from the bottom of the piston.

During movement of the valve actuator, or when in balanced position, the exhaust valve 67 is closed, and at the end of its downward movement the lower end of the stem of the exhaust valve 67 strikes the cover 53 of the exhaust chamber or any other fixed part, so that the valve opens and the brake pressure chamber is in communication with the exhaust chamber, whereby the brake cylinder is open to the atmosphere and the pressure therein is released.

When the valve actuator is balanced as shown in Fig. 1, the axial force acting on the piston rod in one direction (hereinafter called the downward thrust), may be calculated by the sum of the brake pipe pressure multiplied by the effective area of the first piston and the brake cylinder pressure multiplied by the effective area of the second piston, and is equal to the other force acting on the piston rod in the opposite direction (hereinafter called the upward thrust), which may be calculated by multiplying the pressure of the constant pressure chamber by the effective area of the first piston. The weight of the valve actuator as well as friction are ignored for the sake of clearness as the valve is not limited to vertical movement. The pressure of the variable pressure pipe or the pressure of the variable pressure chamber may be varied by operating the train brake valve at the will of the driver, as stated, while the pressure of the constant pressure chamber being kept constant or within a certain limit, the downward thrust may be made larger or smaller in relation to the upward thrust.

When the downward thrust is greater than the upward thrust, the valve actuator moves downward and when the downward thrust is less than the upward thrust, the valve driver moves upward.

It should be noted that by properly determining the ratio of the effective areas of the first piston 54 in the variable pressure chamber 60 and the second piston 56 in the brake pressure chamber 64, the change in the pressure of the variable pressure pipe may be made to bear a similar ratio to the change in the brake pressure, whereby the brake action is rendered more accurate and its operation more easy. For instance, when the brake pipe pressure is varied by 0.1 kilogram per square centimeter, the brake pressure is increased or decreased by 0.5 kilogram per square centimeter. The advantage of this relation will be further illustrated.

The construction of the differential valve D. V., and the brake cylinder B. C. in the trailer car, is quite similar to those in the motor car. In Fig. 2 154 is the first piston, 156 is the second piston, 155 is the piston rod connecting the pistons to each other, 160 is the variable pressure chamber, 168 is the exhaust chamber, 161 is the constant pressure chamber, 164 is the brake air chamber, 162 is the automatic air chamber. The actions of the differential valve and the brake cylinder in the trailer car are the same as those described above.

The operation of the air brake apparatus is as follows:

When it is desired to give the brake action, operator moves the handle 25 of the train brake valve, T. V. to the position about at "c" in Fig. 7. The pressure of the variable pressure pipe 18 and 118 is reduced as is the pressure in the variable pressure chambers 60 and 160 so that the upward thrusts of the valve actuators overcome the downward thrusts, to move the pistons upward as stated and the upper sides of the second pistons strike the lower ends of the brake air valves 57 and 157. The latter are thereby opened and the air pressure accumulated in the automatic air reservoirs 43 and 143 rushes through the automatic air chambers 62 and 162 into the brake air chambers 64 and 164 and thence through the brake cylinder pipes 70 and 170 to supply the brake cylinders 71 and 171. The brake pistons 72 and 172 with the piston rods 73 and 173 are moved outwardly and by means of levers and other suitable mechanisms, brake action is given to the car wheels.

When it is desired to cause release action, the handle 25 of the train brake valve T. V. is moved to the position shown at "A" in Fig. 3. The pressure in the variable pressure pipes 18 and 118 is increased, the downward thrusts of the pistons overcome the upward thrusts, so that the valve actuators are moved downward. At the end of the downward movement of the pistons, the lower ends of the exhaust valves 58 and 158 strike the covers 53 and 153 and the exhaust valves 58 and 158 are opened, so that the brake pressure chambers 64 and 164 are in communication with the exhaust chambers 68 and 168 and the brake cylinders 71 and 171 are open to the atmosphere. The pressure on the brake pistons 72 and 172 is released and by means of the springs 74 and 174 they are returned to normal position, thereby releasing the brake force on the car wheels.

For causing a partial brake action, the pressure of the variable pressure pipes 18 and 118 is slightly reduced, as stated in the case of brake action, and the handle 25 is then moved to the lapping position, as shown at B' in Fig. 5. The valve actuators move upwardly and the second pistons 56 and 156 strike the stems of the brake air valves 57 and 157, so that air pressure is supplied into the brake cylinders 71 and 171 to apply brake force on the car wheels as already stated. When the brake pressure increases, the pressure in the brake pressure chambers 64 and 164 is also increased and thereby the downward thrusts acting on the second pistons 56 and 156 become increased, which finally counterbalances the increase of upward thrusts previously caused by the reduction of pressure in the variable pressure chambers. The brake air valves are thereby closed and the valve actuators are again brought into balanced position, the brake pressure maintained, and the partial brake action is obtained.

For partial release, the brake pipe pressure is slightly increased as stated in the case of release, and the handle is then moved to "lap" position (Fig. 5). The valve actuators move downwardly so as to open the exhaust valves 58 and 158, and the brake cylinders 71 and 171 are opened to the atmosphere. The pressure in the brake pressure chambers acting on the second pistons, decreases, which causes a decrease in the downward thrusts, and when said decrease equals the increase of the downward thrusts previously caused by the increase of pressure of the variable pressure chambers, the release action stops, thus the partial release is obtained.

For emergency brake action, the handle 25 of the train brake valve, T. V., is moved quickly to the brake position (Fig. 7) and is held there. The brake pipe pressure decreases suddenly and aforesaid brake action takes place suddenly to give the emergency brake.

In the air brake apparatus in use provided with the triple valve device, many defects are found owing to the fact that partial brake action is obtained after brake air has been introduced into the brake cylinder, and the air is immediately cut off by a slide valve irrespective of brake cylinder pressure. The air in the brake cylinder being shut from the distributing mechanism, the brake cylinder pressure can by no means be adjusted, and the relation between the reduction of brake pipe pressure and corresponding brake pressure is quite uncertain.

In other words, in a train of cars provided with ten brake cylinders, when the brake pipe pressure has been reduced by 0.5 kilogram per square centimeter for giving a partial brake, it is quite uncertain whether equal brake pressures corresponding to said reduction of 0.5 kilogram per square centimeter of the brake pipe pressure have been given to each of the ten brake cylinders, even in case the stroke of each brake piston is equal. As a matter of fact, the adjustment and the resistance of the air passages of the triple valve are never manufactured equal for each brake cylinder and equality of brake pressure can never be expected. Furthermore, the stroke of each brake piston not being equal, owing to the difference in the wear of the brake blocks or of the clearance of the brake riggings, equal brake pressure cannot be expected. According to the differences of the brake pressure for each brake cylinder, the brake force on each wheel may perhaps differ such as to exceed the limit of brake force on some of the wheels to cause "skidding", while for other wheels it may be far below the limit of brake force.

According to the present invention, such difficulties may be entirely overcome. Owing to the fact that the brake pressure chambers 64 and 164 of the differential valves are kept in communication to the brake cylinders 71 and 171 (this feature is to be especially noted), brake air may be supplied continuously until the valve actuators are brought to balance, regardless of any differences in strokes of the brake pistons 72 and 172 or of the resistance in air passages, as stated before. The brake pressure is, therefore, equal throughout the train.

Furthermore, in the air brake apparatus in use, the brake action becomes gradually weakened by successive repeated use, owing to the reduction of pressure in the auxiliary air reservoir, unless a proper interval of release is maintained. For instance, when a train runs down a long slope, brake and release actions are alternately repeated so that the air in the auxiliary air reservoir (which corresponds to the automatic air reservoir of the present invention) lost at the time of brake action may be restored at the time of release. If the time of release is too short, on one hand, the air pressure cannot be sufficiently recovered, while on the other hand if the time of release is too long, the speed of train may become excessive. The operator has many difficulties in this respect. According to the present invention, the automatic air reservoir, while supplying brake air to the brake cylinder on one side, is in communication at the other side to the high pressure pipe, irrespective of the distributing mechanism, so that as soon as the pressure in the automatic air reservoir is decreased, air is supplied from the high pressure reservoir. By using an air compressor and reservoir of a capacity equal to those now in use, the brake action may be repeated almost indefinitely and even when brake or partial brake action is maintained for a long time, the brake pressure will be unchanged.

The coefficient of friction between the car wheels and the brake blocks is comparatively small while the relative speed between them is large, and gradually increases according to the decrease of the relative speed to be remarkably heavy at the instant the car stops. As the wheels roll on the rail, the coefficient of friction between the rail and car wheels is very small, in comparison to the speed of the car. To obtain a perfect brake action, that is to say, to make the train reduce its speed at a uniform rate from the beginning of the brake action until the train is stopped, and to avoid the shock at the time of the stop, it is therefore necessary to give the brake block a varying brake pressure, maximum while the train speed is large and gradually and successively diminishing according to the decrease of train speed until it becomes minimum at the instant the train stops. A perfect "partial" brake action is therefore of great importance for the operation of the air brake apparatus.

In air brake apparatus in use provided with triple valve devices, it is very difficult to obtain a gradual, successive and accurate release even when provided with special mechanisms for this purpose. In practicing partial release for a train, therefore, the brake force is entirely lost for some cars while excessive brake force might remain for another car. Thus the whole train is operated by the average of those unequal brake forces.

According to the present invention the brake cylinder pressure is released precisely in proportion to the gradual and successive recovery of the brake pipe pressure and no difference of pressure takes place throughout all of the brake cylinders of the entire train and the desired brake action may be obtained.

Moreover, in other air brake apparatus, the train valve and the air distributing mechanism are each provided with a special operative position for emergency brake, but it is very difficult at the time of emergency to make use of the position of the handle for operating the special mechanism. According to the present invention, the distributing mechanism itself is characterized by its sensitiveness and absolute steadiness, so that emergency brake action may be automatically performed according to the speed of operation without the need of being provided with the emergency position.

Also in other brake apparatus provided with the triple valve device, the air brake valves are also generally provided with a release position (the release position of the brake valve in the present invention corresponding to the driving position in the other apparatus) for supplying air pressure from the primary air reservoir directly into the brake pipe in view of quickly performing a release action and at the same time charging the auxiliary air reservoir with compressed air. In case the brake valve is not properly used, an overcharge of air is apt to take place which causes unexpected brake action to hinder the running of the train and unless being "kicked off" several times the brake valve cannot be released. According to the present invention, the brake pressure is released by simply recovering the reduced pressure of the variable pressure pipe with the air of the high pressure pipe without need of charging the automatic air reservoir. The brake valve therefore need not be provided with a position for supplying the primary reservoir air directly into the brake pipe, so that a single release position may suffice for the driving position and the release position and the overcharge of air can be entirely avoided. The train brake valve in the present invention may perfectly operate the differential valve by providing only three positions; "release", "lap" and "brake".

In the triple valve device, the brake pressure caused by a certain decrease of the brake pipe pressure is unknown to the operator. According to the present invention the operator may know the brake pressure for all the brake cylinders by reading the decrease of the pressure of the variable pressure pipe by the pressure gage provided in the operator room. Further, when some cars become separated from the train while running, by accident, the tendency of the pressure in the high pressure pipe and brake pipe is to fall to atmospheric pressure by brakage of the joining hose. But the check valves 42 and 142 prevent the automatic air reservoirs from losing their pressure air, whereby the maximum brake action may be given for both separated trains.

The air brake apparatus of the present invention, as above stated, is absolutely reliable in operation and simple in construction, in comparison to those provided with the triple valve device. According to the present invention, the triple valve device having the slide valve, which is expensive and troublesome to manufacture, owing to much lapping and other high class workmanship, and its complicated air passages, is dispensed with, and the cause of accidents may be entirely avoided. The cost of manufacture is lessened considerably and the safety in driving the train is increased.

Figs. 10 and 11 show a modified form of the invention. Fig. 10 is the air brake apparatus for the motor car and Fig. 11 is the same for the trailer car. They are characterized by the fact that the constant pressure chambers 61 and 161 are separate from the automatic air chambers 62 and 162 and are connected to the constant air reservoirs 47 and 147 arranged apart from the brake pipe lines, said constant air reservoirs 47 and 147 being supplied with air pressure from the brake pipes 18 and 118 through check valves 46 and 146. The operation of the modified apparatus is quite similar to that shown in Figs. 1 and 2.

According to the modified form, first, the pressure in the constant pressure chambers 61 and 161 is never effected by the change of pressure of the brake pipe lines and thereby the decrease of pressure indicated at the pressure gage arranged in the operator room, perfectly shows the difference of pressure in the constant pressure chamber and the variable pressure chamber, so that the brake pressure may be more precisely known. Second, the feed valve 19 may be arranged on the high pressure branch pipe 27, as shown, and the pressure in the high pressure pipes 17 and 117 will be equal to the pressure of the primary air reservoir, while the pressure in the brake pipes 18 and 118 is lower. This is one of the novel features of the present invention. The brake pressure thus may be increased to the primary air reservoir pressure while the pressure in the brake pipe lines being kept comparatively low, the leakage of air at air pipes and their joints will be lessened, the cost of manufacture being thereby saved and troubles may be avoided.

When a part of the train becomes separated while running, the hoses connected to the high pressure pipe and brake pipe are broken and the tendency of the pressure of said pipes is to fall to the atmospheric pressure, but the escape of air pressure in the automatic air reservoirs and the constant air reservoirs is prevented by the check valves 42, 142 and 46, 146, provided on their feed pipes so that corresponding maximum brake action may be automatically given on both of the separated trains.

As will be apparent, the variable pressure chamber is arranged adjacent to the constant pressure chamber and the brake pressure chamber adjacent to the exhaust chamber, so that the difference of pressure at both sides of each piston while at release is minimized and the loss of air, owing to leakage, is lessened.

Other modifications may be made without departing from the scope of the invention.

What I claim is:—

1. In an air brake system, the combination of a source of fluid pressure; a high pressure reservoir; a brake cylinder; an auxiliary reservoir; a high pressure pipe connected to the high pressure reservoir and the auxiliary reservoir; a brake pipe; a brake valve connected between the high pressure pipe and the brake pipe and adapted to increase or decrease the pressure in said brake pipe; a differential valve having connections to the auxiliary reservoir, the brake pipe and the brake cylinder; a valve actuator in said differential valve having pistons of different areas adapted to be normally balanced by the differential of pressure of the auxiliary reservoir pressure and the brake pipe pressure being equal to the brake cylinder pressure or by the brake pipe pressure being equal to the auxiliary reservoir pressure and to be actuated to apply the brakes when the brake pipe pressure is less than the auxiliary reservoir pressure and to release the brakes when the differential of the auxiliary reservoir and the brake pipe pressures is less than the brake cylinder pressure.

2. In an air brake system, the combination of a source of fluid pressure; a high pressure reservoir; a high pressure pipe having a branch pipe connected to said reservoir; a check valve in said branch pipe; a plurality of auxiliary reservoirs; a pipe connected between each of said reservoirs and the high pressure pipe; a check valve in each of said pipes; a brake pipe; a brake valve having branch pipes communicating with the high pressure pipe, the brake pipe and the atmosphere, said valve being adapted to supply air from the high pressure pipe to the brake pipe to hold the pressure in the brake pipe or to release it therefrom; a brake cylinder and a differential valve for each auxiliary reservoir; each of said valves being connected to one of the brake cylinders, one of the auxiliary reservoirs and the brake pipe; a valve actuator in each differential valve comprising a pair of pistons rigidly connected together and of different areas and adapted to be balanced by both the pressure of the brake pipe acting on the larger piston and the pressure of the brake cylinder acting on the smaller piston in one direction, against the pressure of the auxiliary reservoir acting on the larger piston in the other direction, and adapted to be moved to cause the brakes to be applied or released by the decrease or increase of pressure in the brake pipe.

3. In an air brake system, the combination of a source of fluid pressure, a plurality of brake cylinders; an auxiliary reservoir and a differential valve for each brake cylinder; a brake pipe connecting the source of fluid pressure to the valves; a brake valve to control the pressure in said pipe; a high pressure pipe connecting the auxiliary reservoirs to the source of fluid pressure to maintain a maximum pressure in said reservoirs at all times; a valve actuator in each differential valve having pistons of different areas, the larger and smaller of said pistons being subjected in one direction to the brake pipe and brake cylinder pressures respectively and in the other direction to the auxiliary reservoir and atmospheric pressures respectively, said actuator to be balanced by a proper ratio of said pressures and to be moved by a change in said ratio.

HIDEO KOBAYASHI.